United States Patent
Loftus et al.

(10) Patent No.: US 9,931,949 B2
(45) Date of Patent: Apr. 3, 2018

(54) FAULT DETECTION IN A MULTI-HIGH VOLTAGE BUS SYSTEM

(71) Applicant: Ford Global Technologies, LLC, Dearborn, MI (US)

(72) Inventors: Michael Edward Loftus, Northville, MI (US); Benjamin A. Tabatowski-Bush, South Lyon, MI (US); Michael Schamber, Milford, MI (US); Jianwei Li, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 170 days.

(21) Appl. No.: 15/054,629

(22) Filed: Feb. 26, 2016

(65) Prior Publication Data
US 2017/0246959 A1  Aug. 31, 2017

(51) Int. Cl.
*B60L 11/18* (2006.01)

(52) U.S. Cl.
CPC ....... *B60L 11/1809* (2013.01); *B60L 11/1857* (2013.01); *B60L 11/1861* (2013.01)

(58) Field of Classification Search
CPC .............. B60L 11/1809; B60L 11/1861; B60L 11/1857
USPC ........................................................ 320/162
See application file for complete search history.

(56) References Cited

U.S. PATENT DOCUMENTS

| | | | | |
|---|---|---|---|---|
| 6,504,344 | B1 * | 1/2003 | Adams et al. ..... | G01R 31/3658 320/132 |
| 7,109,686 | B2 * | 9/2006 | Schulte et al. ............ | B60L 7/06 307/109 |
| 7,690,456 | B2 * | 4/2010 | Deng et al. .............. | B60K 6/26 180/65.265 |
| 8,575,940 | B2 | 11/2013 | Yugou et al. | |
| 9,707,855 | B1 * | 7/2017 | Wang et al. ........ | B60L 11/1861 |
| 9,718,374 | B2 * | 8/2017 | Tang et al. .......... | B60L 11/1851 |
| 9,776,643 | B2 * | 10/2017 | Skaff et al. ........... | B60W 50/14 |
| 2015/0251542 | A1 | 9/2015 | Mensah-Brown et al. | |

FOREIGN PATENT DOCUMENTS

CN    201985573 U    9/2011

* cited by examiner

*Primary Examiner* — Sun Lin
(74) *Attorney, Agent, or Firm* — David Kelley; Brooks Kushman

(57) ABSTRACT

A vehicle bus system includes a controller programmed to, after issuing a command to close first and second contactors, wherein the first and second contactors are arranged to share a first terminal of a battery, the first contactor is configured to power a first load when closed, and the second contactor is configured to power a second load when closed, initiate pre-charge of a second terminal of the battery in response to respective first and second voltages across the first and second contactors exceeding corresponding first and second closed-state voltage thresholds, and generate a notification and preclude initiation of the pre-charge in response to one of the first and second voltages being less than the corresponding first and second closed-state voltage thresholds.

17 Claims, 5 Drawing Sheets

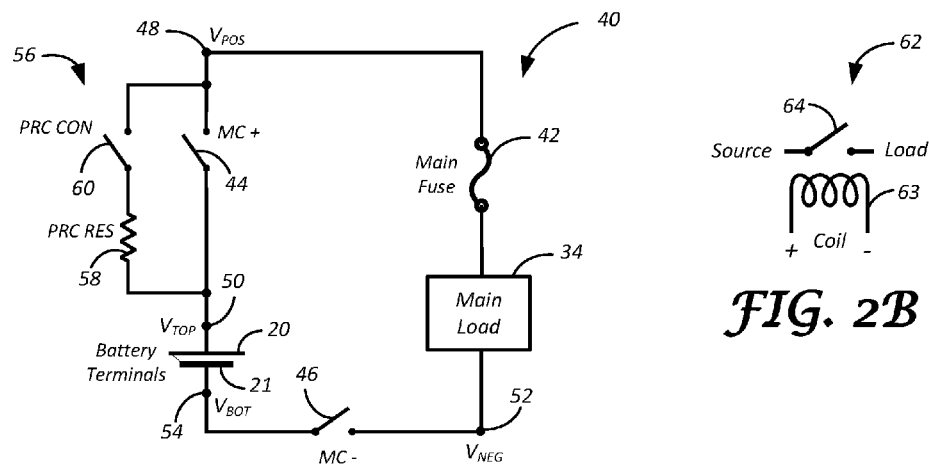
FIG. 2A
FIG. 2B
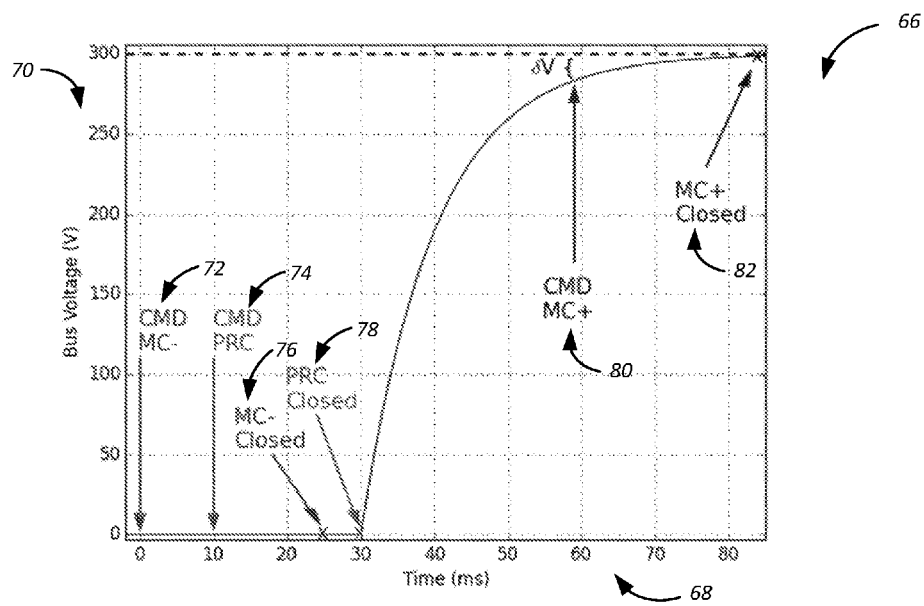
FIG. 3

FAULT DETECTION IN A MULTI-HIGH VOLTAGE BUS SYSTEM

TECHNICAL FIELD

The present disclosure relates to systems and methods for performing fault detection in a multi-high voltage (HV) bus system.

BACKGROUND

A hybrid or an electric vehicle may be equipped with at least one traction battery configured to provide energy for propulsion. The traction battery may also provide energy for other vehicle electrical systems. For example, the traction battery may transfer energy to high voltage loads, such as compressors and electric heaters. In another example, the traction battery may provide energy to low voltage loads, such as an auxiliary 12V battery.

SUMMARY

A vehicle bus system includes a controller programmed to, after issuing a command to close a pair of contactors arranged to share a battery terminal and each configured to power a load when closed, initiate pre-charge of another terminal in response to voltages across the contactors exceeding corresponding closed-state thresholds, and generate a notification and preclude initiation of the pre-charge in response to one of the voltages being less than the corresponding closed-state threshold.

A method includes, after issuing by a controller a command to close a pair of contactors arranged to share a battery terminal and each configured to power a load when closed, initiating pre-charge of another terminal in response to voltages across the contactors being greater than corresponding closed-state thresholds, and generating a notification and precluding initiation of the pre-charge in response to one of the voltages being less than the corresponding closed-state threshold.

A vehicle bus controller includes input channels configured to receive signals indicative of voltages across a pair of contactors arranged to share a battery terminal and each configured to power a load when closed, output channels configured to provide a command to close the contactors, provide a command to initiate pre-charge of another traction battery terminal, and provide a notification, and control logic configured to, after issuance of the command to close the contactors, generate the command to initiate pre-charge of another terminal in response to the voltages being greater than corresponding closed-state thresholds and to generate the notification in response to one of the voltages being less than the corresponding closed-state threshold for a period longer than a closing delay of the corresponding contactor.

BRIEF DESCRIPTION OF THE DRAWINGS

FIG. 2A is a block diagram illustrating a contactor arrangement for a single high voltage bus system;

FIG. 2B is a circuit diagram illustrating a contactor;

FIG. 3 is a graph illustrating a sequence of commands for a single high voltage bus system;

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
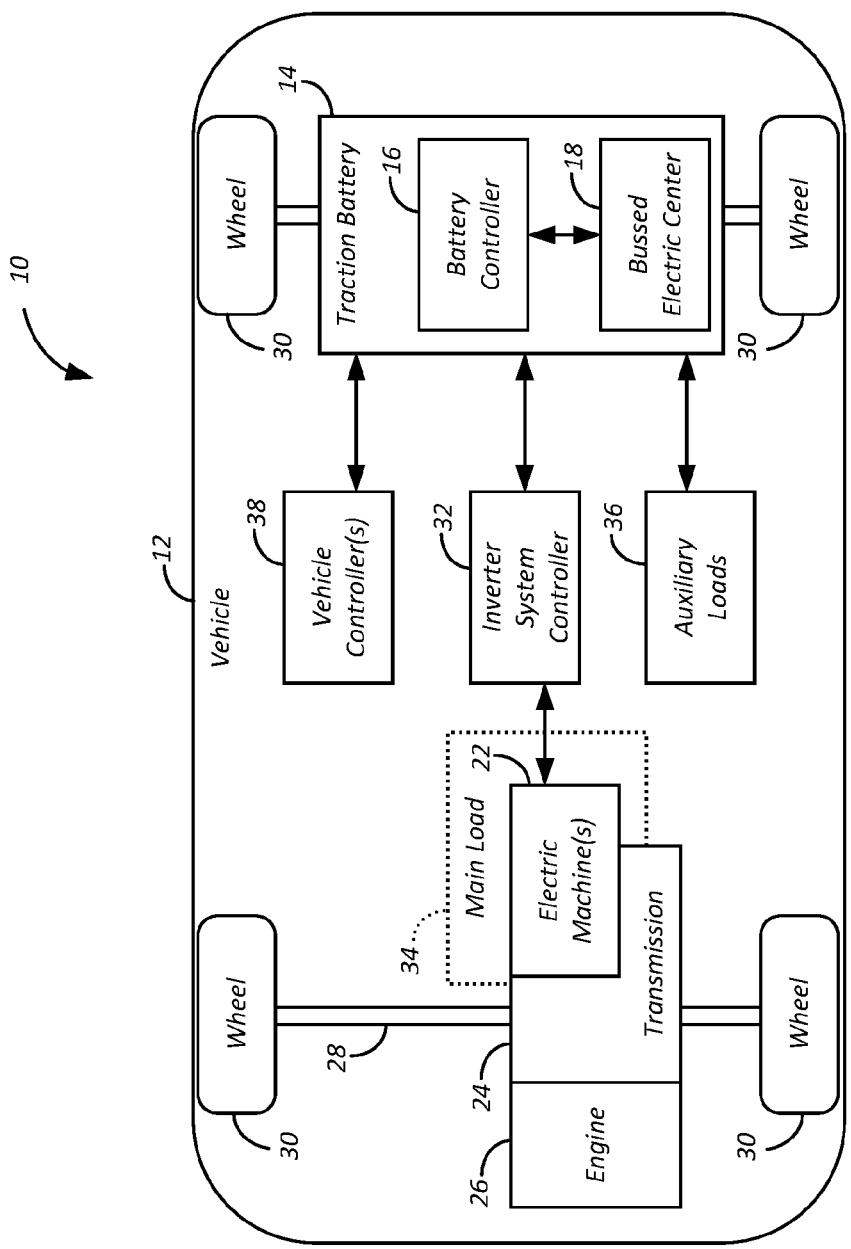
FIG. 1 is a block diagram of a plug-in hybrid electric vehicle (PHEV) illustrating a typical drivetrain and energy storage components.

FIG. 1 depicts an example plug-in hybrid-electric vehicle (PHEV) system 10. A plug-in hybrid-electric vehicle 12, hereinafter vehicle 12, may comprise at least one traction battery or battery pack 14. The battery pack 14 includes a battery controller 16 and may be configured to receive electric charge via a charging session at a charging station connected to a power grid. In one example, the power grid may include a device that harnesses renewable energy, such as a photovoltaic (PV) solar panel, or a wind turbine.

The battery pack 14 may comprise one or more battery cells (not shown), e.g., electrochemical cells, capacitors, or other types of energy storage device implementations. The battery cells may be arranged in any suitable configuration and configured to receive and store electric energy for use in operation of the vehicle 12. Each cell may provide a same or different nominal threshold of voltage. The battery cells may be further arranged into one or more arrays, sections, or modules further connected in series or in parallel.

The battery pack 14 may further comprise a bussed electric center (BEC) 18 electrically connected to the battery cells, e.g., such as via a positive and a negative battery terminals 20, 21. As will be described in further detail in reference to at least FIGS. 2A-5, the BEC 18 may be in communication with the battery controller 16 and may include a plurality of connectors and switches allowing the supply and withdrawal of electric energy to and from the battery pack 14.

The battery controller 16 is electrically connected with the BEC 18 and controls the energy flow between the BEC 18 and the battery cells. For example, the battery controller 16 may be configured to monitor and manage temperature and state of charge of each of the battery cells. The battery controller 16 may command the BEC 18 to open or close a plurality of switches in response to temperature or state of charge in a given battery cell reaching a predetermined threshold.

The battery controller 16 may be in communication with one or more vehicle controllers 38, such as, but not limited to, an engine controller (ECM) and transmission controller (TCM), and may command the BEC 18 to open or close a plurality of switches in response to a predetermined signal from the one or more vehicle controllers 38.

The vehicle 12 may further comprise one or more electric machines 22 mechanically connected to a hybrid transmission 24. The electric machines 22 may be capable of operating as a motor or a generator. In addition, the hybrid transmission 24 is mechanically connected to an engine 26. The hybrid transmission 24 is also mechanically connected to a drive shaft 28 that is mechanically connected to the wheels 30.

The electric machines 22 can provide propulsion and deceleration capability when the engine 26 is turned on or off using energy stored in the battery pack 14, such as via the BEC 18. The electric machines 22 also act as generators and can provide fuel economy benefits by recovering energy that would normally be lost as heat in the friction braking system. The electric machines 22 may also provide reduced pollutant emissions since the vehicle 12 may be operated in electric mode under certain conditions.

The battery pack 14 typically provides a high voltage DC output. The BEC 18 of the battery pack 14 may be electrically connected to an inverter system controller (ISC) 32. The ISC 32 is electrically connected to the electric machines 22 and provides the ability to bi-directionally transfer energy, such as via the BEC 18, between the battery pack 14 and the electric machines 22. In one example, the electric machines 22 and other components of the vehicle 12 supplying and/or receiving energy to and from the battery pack 14 may define a main load 34 of the battery pack 14.

In a motor mode, the ISC 32 may convert the DC output provided by the battery pack 14 to a three-phase alternating current as may be required for proper functionality of the electric machines 22. In a regenerative mode, the ISC 32 may convert the three-phase AC output from the electric machines 22 acting as generators to the DC voltage required by the battery pack 14. While FIG. 1 depicts a typical plug-in hybrid electric vehicle, the description herein is equally applicable to a pure electric vehicle. For a pure electric vehicle, e.g., battery electric vehicle (BEV), the hybrid transmission 24 may be a gear box connected to the electric machines 22 and the engine 26 may not be present. In one example, the main load 34 of the battery pack 14 in the BEV may include the electric machines 22 and the gear box.

In addition to providing energy for propulsion, the battery pack 14 may provide energy for other vehicle electrical systems (shown generally as auxiliary loads 36). For example, the battery pack 14 may transfer energy to high voltage loads, such as compressors and electric heaters. In another example, the battery pack 14 may provide energy to low voltage loads, such as an auxiliary 12V battery. In such an example the vehicle 12 may include a DC/DC converter module (not shown) that converts the high voltage DC output of the battery pack 14 to a low voltage DC supply that is compatible with the low voltage loads. The various components discussed may have one or more associated controllers to control and monitor the operation of the components. The controllers may communicate via a serial bus (e.g., Controller Area Network (CAN)) or via discrete conductors.

Referring now to FIG. 2A, an example arrangement 40 of the BEC 18 for energy transfer to and from the main load 34 is shown. The arrangement 40 may include a main fuse 42 protecting the main load 34 from being exposed to excessive electric current. The BEC 18 may comprise a positive main contactor 44 electrically connected to the positive terminal 20 of the battery pack 14 and a negative main contactor 46 electrically connected to the negative terminal 21 of the battery pack 14.

As shown in FIG. 2B, each of the positive and negative main contactors 44, 46 may define an electro-mechanical device 62 comprising an inductive coil 63 and a relay 64, where energizing the inductive coil 63 causes the relay 64 to close and de-energizing the inductive coil 63 causes the relay 64 to open. In one example, a time delay may occur between a first time when the BEC 18 energizes terminals of the relay 64 and a second time when the relay 64 actually closes and connects the load to the source. The time delay may be, for example, between 10 ms and 50 ms or another threshold. The amount of delay a given contactor will experience may be affected by one or more characteristics, such as, but not limited to, design and manufacturer specifications, manufacturing methods and materials, testing, contactor age and/or cycling count, and so on.

In reference to FIG. 2A, voltage across the positive main contactor 44 may be measured at $V_{POS}$ and $V_{TOP}$ reference points 48, 50, and voltage across the negative main contactor 46 may be measured at $V_{NEG}$ and $V_{BOT}$ reference points 52, 54. In one example, closing the positive and negative main contactors 44, 46 allows the flow of electric energy to and from the battery cells of the battery pack 14. In such an example, the battery controller 16 may command the BEC 18 to open or close the main contactors 44, 46 in response to receiving a signal from the one or more vehicle controllers 38, e.g., ECM, TCM, and so on, indicative of a request to initiate or terminate transfer of electric energy between the main load 34 and the battery pack 14.

The BEC 18 may further comprise a pre-charge circuit 56 configured to control an energizing process of the positive terminal 20. In one example, the pre-charge circuit 56 may include a pre-charge resistor 58 connected in series with a pre-charge contactor 60. The pre-charge circuit 56 may be electrically connected in parallel with the positive main contactor 44. When the pre-charge contactor 60 is closed, the positive main contactor 44 may be open and the negative main contactor 46 may be closed, allowing the electric energy to flow through the pre-charge circuit 56 and control an energizing process of the positive terminal 20.

In one example, the battery controller 16 may command BEC 18 to close the positive main contactor 44 and open the pre-charge contactor 60 in response to detecting that voltage across the positive and negative terminals 20, 21 reached a predetermined threshold. The transfer of electric energy between the main load 34 and the battery pack 14 may then continue via the positive and negative main contactors 44, 46. For example, the BEC 18 may support electric energy transfer between the battery pack 14 and the ISC 32 during either a motor or a generator mode via a direct connection to conductors of the positive and negative main contactors 44, 46.

Shown in FIG. 3 is an example graphical representation 66 of a plurality of commands issued by the battery controller 16 to the BEC 18 manipulating the positive and negative main contactors 44, 46 and the pre-charge contactor 60. The graph 66 has x-axis 68 representing time measured in milliseconds and y-axis 70 representing bus voltage measured in volts. The battery controller 16 may command the BEC 18 at a time $t_1$ 72, e.g., $t_1=0$ ms, to close the negative main contactor 46 and command the BEC 18 at a time $t_2$ 74, e.g., $t_2=10$ ms to close the pre-charge contactor 60. In one example, the BEC 18 may cause the one or more contactors to close by energizing their respective inductive coils.

The negative main contactor 46 may close at a time $t_3$ 76 and the pre-charge contactor 60 may close at a time $t_4$ 78. The battery controller 16 may determine that bus voltage changed from $V_1$, e.g., $V_1=0V$, at a time $t_5$ to $V_2$ at a time $t_6$ in response to the closing of both the negative main contactor 46 and the pre-charge contactor 60. The battery controller 16, in response to determining that bus voltage reached a predetermined threshold and/or at a time $t_7$ 80, may command the BEC 18 to close the positive main contactor 44. In one example, the battery controller 16 may command the BEC 18 to close the positive main contactor 44 a predetermined period after determining that bus voltage reached a predetermined threshold. The positive main contactor 44 may close at a time $t_8$ 82. The battery controller 16 may determine that bus voltage changed from $V_3$ to $V_4$, where $|V_4-V_3|=\delta V$, in response to the closing of the positive main contactor 44.

In another example, the battery controller 16 may enable energy transfer to the high voltage loads, such as compressors and electric heaters, via a direct connection to the positive and negative main contactors 44, 46. In still another example, the battery controller 16 may command energy transfer to the low voltage loads, such as an auxiliary 12V battery, via a DC/DC converter (not shown) connected to the positive and negative main contactors 44, 46.

Figure 4:
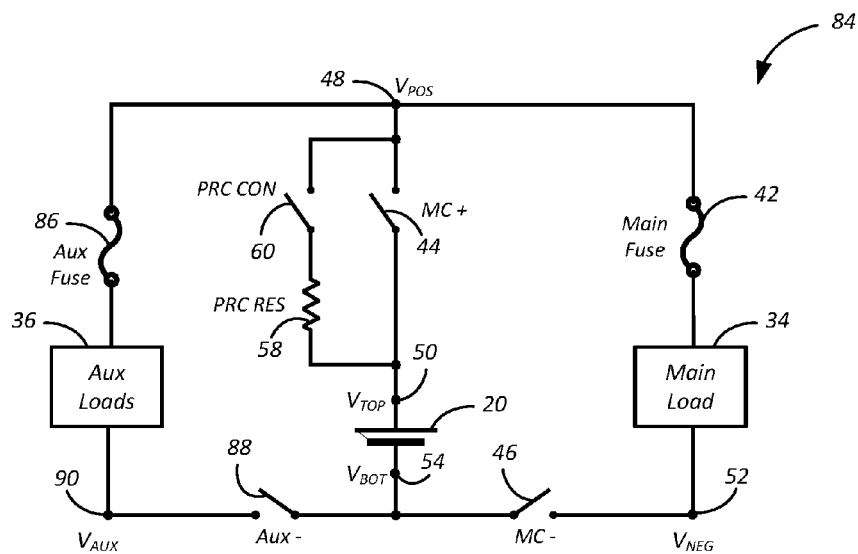
FIG. 4 is a block diagram illustrating a contactor arrangement for a multi-high voltage bus system.

Referring now to FIG. 4, an example arrangement 84 of the BEC 18 for energy transfer between the main load 34 and the battery pack 14 and between the auxiliary loads 36 and the battery pack 14 is shown. In addition to components described in reference to the example arrangement 40 of FIG. 2A, the arrangement 84 may include an auxiliary fuse 86 protecting the auxiliary loads 36 from being exposed to excessive electric current. The BEC 18 may further comprise an auxiliary contactor 88 electrically connected to the negative terminal 21 of the battery pack 14. In one example, the auxiliary contactor 88 may comprise the electro-mechanical device 62 described previously in reference to FIG. 2B.

Voltage across the auxiliary contactor 88 may be measured at $V_{AUX}$ and $V_{BOT}$ reference points 90, 54. In one example, closing the positive main and auxiliary contactors 44, 88 allows the flow of electric energy between the auxiliary loads 36 and the battery pack 14. In such an example, the battery controller 16 may command the BEC 18 to open or close the auxiliary contactor 88 in response to receiving a signal from the one or more vehicle controllers 38, e.g., ECM, TCM, and so on, indicative of a request to initiate or terminate transfer of electric energy between the auxiliary loads 36 and the battery pack 14.

As described previously in reference to FIG. 2B, a time delay may occur between a first time when the battery controller 16 commands the BEC 18 to close the contactor, e.g., by energizing an inductive coil of the contactor, and a second time when the contactor actually closes and connects the load to the source. The amount of delay associated with a given contactor may be affected by one or more characteristics, such as, but not limited to, design and manufacturer specifications, manufacturing methods and materials, testing, contactor age and/or cycling count, and so on. Moreover, in a high voltage system comprising multiple high voltage buses powering a plurality of electrical loads, such as, for example, the arrangement 84 of FIG. 4, time delays among the plurality of contactors may vary due to varying cycling counts and other variables.

Figure 5:
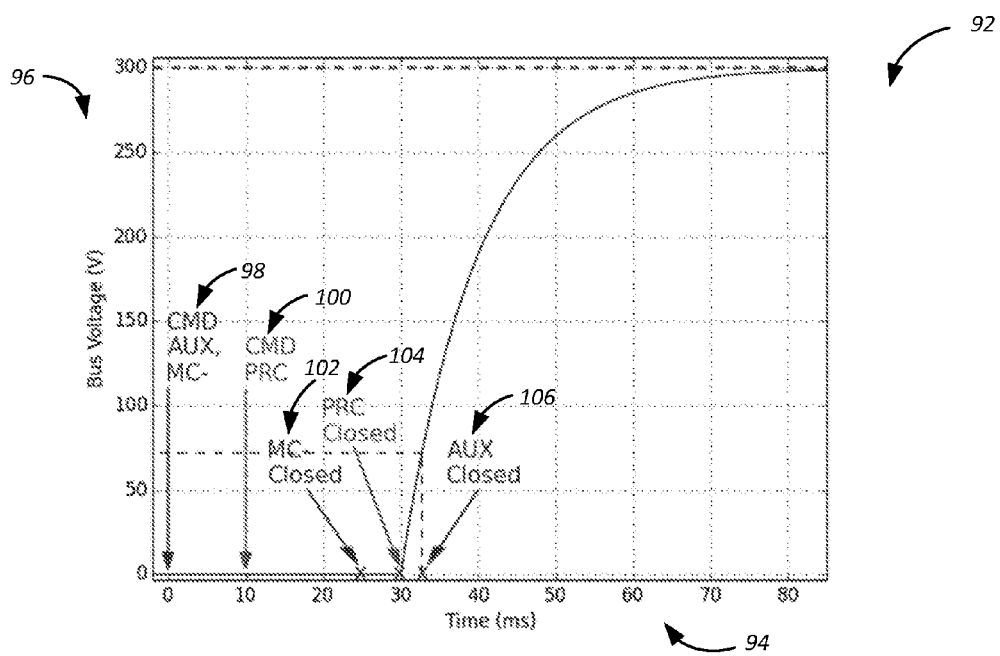
FIG. 5 is a graph illustrating a sequence of commands for a multi-high voltage bus system.

Shown in FIG. 5 is an example graphical representation 92 of a plurality of commands issued by the battery controller 16 to the BEC 18 manipulating the negative main and auxiliary contactors 46, 88 and the pre-charge contactor 60. The graph 92 has x-axis 94 representing time measured in milliseconds and y-axis 96 representing bus voltage measured in volts. The battery controller 16 may command the BEC 18 at a time $t_9$ 98, e.g., $t_9=0$ ms, to close the negative main and the auxiliary contactors 46, 88 and command the BEC 18 at a time $t_{10}$ 100, e.g., $t_{10}=10$ ms, to close the pre-charge contactor 60. In one example, the BEC 18 may cause the one or more contactors to close by energizing their respective inductive coils.

The negative main contactor 46 may close at a time $t_{11}$ 102 and the pre-charge contactor 60 may close at a time $t_{12}$ 104. The battery controller 16 may determine that bus voltage changed from $V_1$ at a time $t_{13}$ in response to the closing of both the negative main contactor 46 and the pre-charge contactor 60. In one example, the auxiliary contactor 88 may close at a time $t_{14}$ 106 or a predetermined period after bus voltage began to change from $V_1$. Thus, bus voltage may have reached a predetermined threshold $V_3$ when the auxiliary contactor 88 closed at a time $t_{14}$ 106.

Figure 6A:
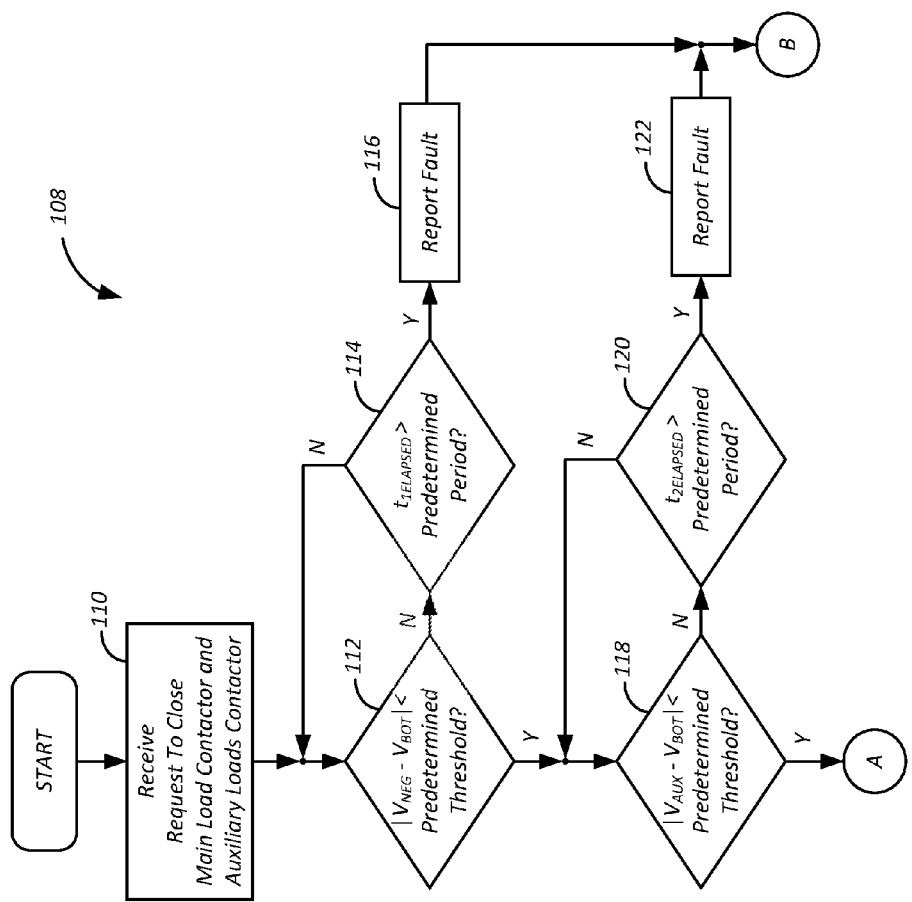
FIGS. 6A-6B are flowcharts illustrating an algorithm for performing fault detection in a multi-high voltage bus system.
Figure 6B:
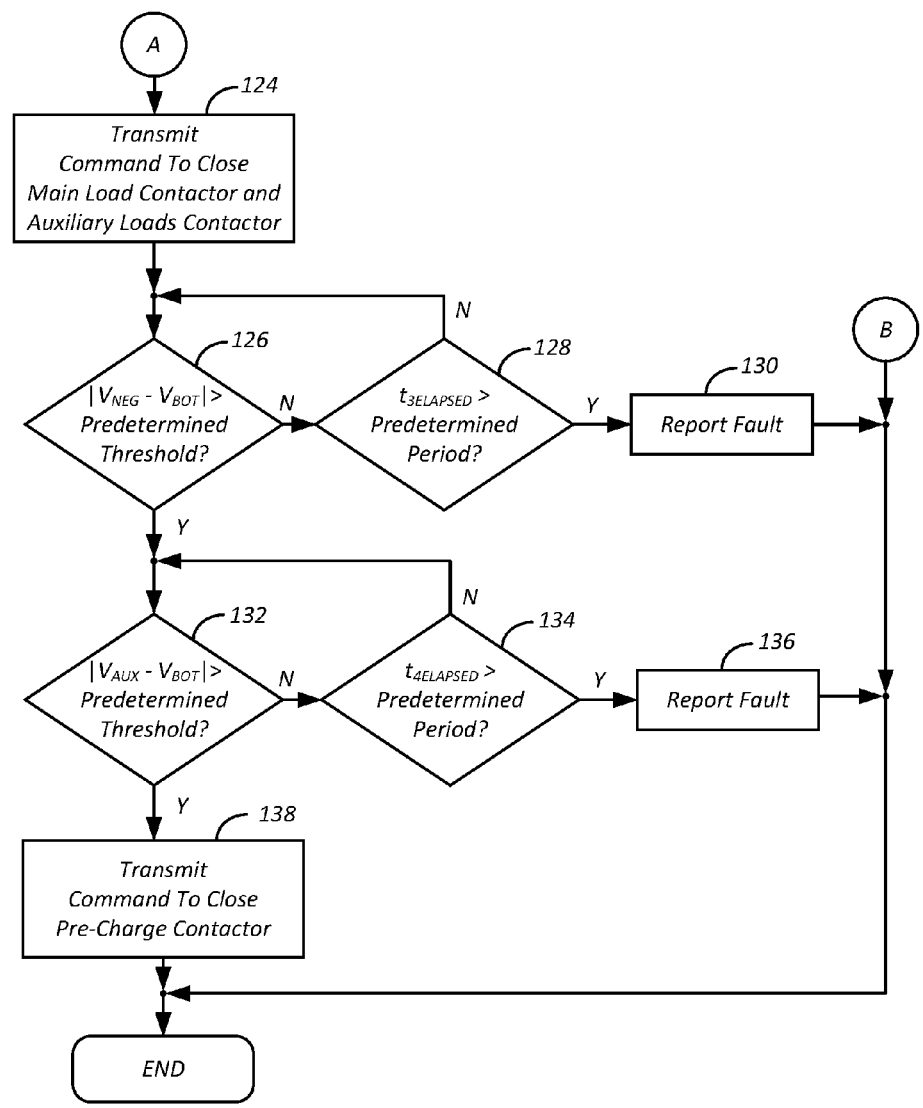

In reference to FIGS. 6A and 6B, a diagnostic method 108 for performing a multi-high voltage bus system fault detection is shown. The method 108 may begin at block 110 where the battery controller 16 receives a signal indicative of a request to close the negative main and the auxiliary contactors 46, 88. In one example, the battery controller 16 may receive a request to close the negative main and the auxiliary contactors 46, 88 from the one or more vehicle controllers 38 in response to a request to start the vehicle 12.

At block 112 the battery controller 16 determines whether the negative main contactor 46 is open. In one example, the battery controller 16 determines whether the negative main contactor 46 is open by determining whether an absolute value of a difference between $V_{NEG}$ and $V_{BOT}$ reference points 52, 54 is less than a predetermined threshold, e.g., 20V. The battery controller 16 determines at block 114 whether an elapsed time $t_{1_{ELAPSED}}$ is greater than a predetermined period in response to determining at block 112 that the negative main contactor 46 is closed, e.g., a difference (or an absolute value of a difference) between $V_{NEG}$ and $V_{BOT}$ reference points 52, 54 is greater than a predetermined threshold.

In one example, an elapsed time $t_{1_{ELAPSED}}$ may be a period elapsed since the battery controller 16 received at block 110 a signal indicative of a request to close the negative main and the auxiliary contactors 46, 88. In another example, the battery controller 16 may adjust a predetermined period using one or more factors affecting opening time of the negative main contactor 46, such as, but not limited to, design and manufacturer specifications, manufacturing methods and materials, contactor life testing results, expected opening period for a given age and/or cycling count of the contactor. The battery controller 16 may return to block 112 in response to determining at block 114 that an elapsed time $t_{1_{ELAPSED}}$ is less than a predetermined period.

The battery controller 16 reports a fault at block 116 in response to determining at block 114 that an elapsed time $t_{1_{ELAPSED}}$ is greater than a predetermined period. In one example, the battery controller 16 may transmit to the one or more vehicle controllers 38 a signal indicative of a diagnostic fault being detected at the negative main contactor 46. In another example, the battery controller 16 and/or the one or more vehicle controllers 38 may set a diagnostic trouble code (DTC) indicative of a negative main contactor fault. The one or more vehicle controllers 38 may further display an indication to a user of the vehicle 12 that a contactor fault has been detected. The battery controller 16 may then exit the method 108 and preclude initiation of the pre-charge.

At block 118 the battery controller 16 determines whether the auxiliary contactor 88 is open in response to determining at block 112 that the negative main contactor 46 is open. In one example, the battery controller 16 determines whether the auxiliary contactor 88 is open by determining whether a difference (or an absolute value of a difference) between $V_{AUX}$ and $V_{BOT}$ reference points 90, 54 is less than a predetermined threshold, e.g., 20V. The battery controller 16 determines at block 120 whether an elapsed time $t_{2_{ELAPSED}}$ is greater than a predetermined period in response to determining at block 118 that the auxiliary contactor 88 is closed, e.g., a difference between $V_{AUX}$ and $V_{BOT}$ reference points 90, 54 is greater than a predetermined threshold.

In one example, an elapsed time $t_{2_{ELAPSED}}$ may be a period elapsed since the battery controller 16 received at block 110 a signal indicative of a request to close the negative main and the auxiliary contactors 46, 88. In another example, the battery controller 16 may adjust a predetermined period using one or more factors affecting opening period of the auxiliary contactor 88, such as, but not limited to, design and manufacturer specifications, manufacturing methods and materials, contactor life testing results, expected opening time for a given age and/or cycling count of the contactor. The battery controller 16 may return to block 118 in response to determining at block 120 that an elapsed time $t_{2_{ELAPSED}}$ is less than a predetermined period.

The battery controller 16 reports a fault at block 122 in response to determining at block 120 that an elapsed time $t_{2_{ELAPSED}}$ is greater than a predetermined period. In one example, the battery controller 16 may transmit to the one or more vehicle controllers 38 a signal indicative of a diagnostic fault being detected at the auxiliary contactor 88. In another example, the battery controller 16 and/or the one or more vehicle controllers 38 may set a DTC indicative of an auxiliary contactor fault. The one or more vehicle controllers 38 may further display an indication to a user of the vehicle 12 that a contactor fault has been detected. The battery controller 16 may then exit the method 108 and preclude initiation of the pre-charge.

At block 124 the battery controller 16 transmits a signal to the BEC 18 indicative of a command to close the negative main and auxiliary contactors 46, 88 in response to determining at block 118 that the auxiliary contactor 88 is open, e.g., a difference between $V_{AUX}$ and $V_{BOT}$ reference points 90, 54 is less than a predetermined threshold. The battery controller 16 at block 126 determines whether the negative main contactor 46 is closed. In one example, the battery controller 16 determines whether the negative main contactor 46 is closed by determining whether a difference (or an absolute value of a difference) between $V_{NEG}$ and $V_{BOT}$ reference points 52, 54 is greater than a predetermined threshold, e.g., 20V. The battery controller 16 determines at block 128 whether an elapsed time $t_{3_{ELAPSED}}$ is greater than a predetermined period in response to determining at block 126 that the negative main contactor 46 is open, e.g., a difference between $V_{NEG}$ and $V_{BOT}$ reference points 52, 54 is less than a predetermined threshold.

In one example, an elapsed time $t_{3_{ELAPSED}}$ may be a period elapsed since battery controller 16 transmitted at block 124 a signal indicative of a command to close the negative main and the auxiliary contactors 46, 88. In another example, the battery controller 16 may adjust a predetermined period using one or more factors affecting closing time of the negative main contactor 46, such as, but not limited to, design and manufacturer specifications, manufacturing methods and materials, contactor life testing results, expected closing time for a given age and/or cycling count of the contactor. The battery controller 16 may return to block 126 in response to determining at block 128 that an elapsed time $t_{3_{ELAPSED}}$ is less than a predetermined period.

The battery controller 16 reports a fault at block 130 in response to determining at block 128 that an elapsed time $t_{3_{ELAPSED}}$ is greater than a predetermined period. In one example, the battery controller 16 may transmit to the one or more vehicle controllers 38 a signal indicative of a diagnostic fault being detected at the negative main contactor 46. In another example, the battery controller 16 and/or the one or more vehicle controllers 38 may set a DTC indicative of a negative main contactor fault. The one or more vehicle controllers 38 may further display an indication to a user of the vehicle 12 that a contactor fault has been detected. The battery controller 16 may then exit the method 108 and preclude initiation of the pre-charge.

At block 132 the battery controller 16 determines whether the auxiliary contactor 88 is closed in response to determining at block 126 that the negative main contactor 46 is closed. In one example, the battery controller 16 determines whether the auxiliary contactor 88 is closed by determining whether a difference (or an absolute value of a difference) between $V_{AUX}$ and $V_{BOT}$ reference points 90, 54 is greater than a predetermined threshold, e.g., 20V. The battery controller 16 determines at block 134 whether an elapsed time $t_{4_{ELAPSED}}$ is greater than a predetermined period in response to determining at block 132 that the auxiliary contactor 88 is open, e.g., a difference between $V_{AUX}$ and $V_{BOT}$ reference points 90, 54 is less than a predetermined threshold.

In one example, an elapsed time $t_{4_{ELAPSED}}$ may be a period elapsed since the battery controller 16 transmitted at block 124 a signal indicative of a command to close the negative main and the auxiliary contactors 46, 88. In another example, the battery controller 16 may adjust a predetermined period using one or more factors affecting closing time of the auxiliary contactor 88, such as, but not limited to, design and manufacturer specifications, manufacturing methods and materials, contactor life testing results, expected closing time for a given age and/or cycling count of the contactor. The battery controller 16 may return to block 132 in response to determining at block 134 that an elapsed time $t_{4_{ELAPSED}}$ is less than a predetermined period.

The battery controller 16 reports a fault at block 136 in response to determining at block 134 that an elapsed time $t_{4_{ELAPSED}}$ is greater than a predetermined period. In one example, the battery controller 16 may transmit to the one or more vehicle controllers 38 a signal indicative of a diagnostic fault being detected at the auxiliary contactor 88. In another example, the battery controller 16 and/or the one or more vehicle controllers 38 may set a DTC indicative of an auxiliary contactor fault. The one or more vehicle controllers 38 may further display an indication to a user of the vehicle 12 that a contactor fault has been detected. The battery controller 16 may then exit the method 108 and preclude initiation of the pre-charge.

At block 138 the battery controller 16 transmits a signal to the BEC 18 indicative of a command to close the pre-charge contactor 60 in response to determining at block 132 that the auxiliary contactor 88 is closed, e.g., a difference between $V_{AUX}$ and $V_{BOT}$ reference points 90, 54 is greater than a predetermined threshold. At this point the method 108 may end. In one example, the method 108 may be repeated in response to receiving a signal indicative of a request to close the negative main and the auxiliary contactors 46, 88 or in response to another notification or request.

The method 108 contemplates that each of the elapsed times $t_{1ELAPSED}$, $t_{2ELAPSED}$, $t_{3ELAPSED}$, and $t_{4ELAPSED}$ may be different or the same as the rest. Similarly, the method 108 contemplates that a predetermined period it takes for a relay of a given contactor to open may be different or the same as a predetermined period it takes for the relay to close.

The battery controller 16 may transmit a signal to the BEC 18 indicative of a command to close the positive main contactor 44 a predetermined period after commanding the BEC 18 to close the pre-charge contactor 60. In yet another example, the battery controller 16 may transmit a signal to the BEC 18 indicative of a command to close the positive main contactor 44 a predetermined period after determining that the pre-charge contactor 60 is closed.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle bus system comprising:
   first and second contactors arranged to share a first terminal of a battery, the first contactor is configured to power a first load when closed and the second contactor being configured to power a second load when closed, and
   a controller programmed to,
      after issuing a command to close the first and second contactors, initiate pre-charge of a second terminal of the battery, responsive to both a first voltage across the first contactor exceeding a first closed-state voltage threshold and a second voltage across the second contactor exceeding a second closed-state voltage threshold, and
      generate a notification and preclude initiation of the pre-charge responsive to at least one of the first and second voltages being less than the corresponding first and second closed-state voltage thresholds.

2. The system of claim 1, wherein the controller is further programmed to generate the notification and preclude initiation of the pre-charge responsive to one of the first and second voltages exceeding respective first and second open-state voltage thresholds prior to the issuing of the command to close the first and second contactors.

3. The system of claim 2, wherein the controller is further programmed to generate the notification and preclude initiation of the pre-charge responsive to one of the first and second voltages exceeding the respective first and second open-state voltage thresholds for a period longer than respective first and second opening delays defining respective first and second ages of the first and second contactors, respective first and second cycling counts of the first and second contactors, or age of the battery.

4. The system of claim 3, wherein the respective first and second opening delays defining the respective first and second ages, the respective first and second cycling counts, or the age of the battery are same.

5. The system of claim 1, wherein the controller is further programmed to generate a notification and preclude initiation of the pre-charge responsive to, after the commanding to close the first and second contactors, one of the first and second voltages being less than the corresponding first and second closed-state voltage thresholds for a period longer than respective first and second closing delays.

6. The system of claim 5, wherein the controller is further programmed to modify the respective first and second closing delays defining respective first and second contactor age, cycling count, or age of the battery.

7. The system of claim 5, wherein the respective first and second closing delays associated with the first and second contactors are same.

8. A method comprising:
   after commanding by a controller to close first and second contactors arranged to share a first battery terminal and each configured to power a respective load when closed, initiating pre-charge of a second battery terminal responsive to respective voltages across the contactors being greater than corresponding closed-state thresholds, and generating a notification and precluding initiation of the pre-charge responsive to one of the voltages being less than the corresponding closed-state threshold.

9. The method of claim 8 further comprising generating by the controller the notification and precluding initiation of the pre-charge responsive to one of the voltages being greater than an open-state threshold prior to the commanding to close the first and second contactors.

10. The method of claim 9 further comprising generating by the controller the notification and precluding initiation of the pre-charge responsive to one of the voltages being greater than the corresponding open-state thresholds for a period longer than respective opening delays defining respective first and second ages of the first and second contactors, respective first and second cycling counts of the first and second contactors, or age of the battery.

11. The method of claim 10, wherein the respective opening delays defining the respective first and second ages, the respective first and second cycling counts, or the age of the battery are same.

12. The method of claim 8 further comprising generating by the controller the notification and precluding initiation of the pre-charge in response to, after the commanding to close the first and second contactors, one of the voltages being less than the corresponding closed-state threshold for a period longer than respective closing delays.

13. The method of claim 12 further comprising modifying by the controller the respective closing delays defining respective first and second ages of the first and second contactors, respective first and second cycling counts of the first and second contactors, or age of the battery.

14. The method of claim 12, wherein the respective closing delays of the first and second contactors are same.

15. A vehicle bus controller comprising:
input channels configured to receive first and second signals indicative of first and second voltages across respective first and second contactors, wherein the first and second voltages are arranged to share a first terminal of a traction battery, and wherein the first and second contactors, when closed, are configured to power corresponding first and second loads;
output channels configured to command to close the first and second contactors, command to initiate pre-charge of a second terminal of the traction battery, and provide a notification; and
control logic configured to, after issuance of the command to close the first and second contactors, command to initiate pre-charge of the second terminal responsive to the first and second voltages being greater than corresponding first and second closed-state voltage thresholds of the first and second contactors, and generate the notification responsive to one of the first and second voltages being less than the corresponding first and second closed-state voltage thresholds for a period longer than respective first and second closing delays associated with the first and second contactors.

16. The controller of claim 15, wherein the respective first and second closing delays are same.

17. The controller of claim 15, wherein the control logic is further configured to generate the notification and preclude initiation of the pre-charge responsive to one of the first and second voltages exceeding respective first and second open-state voltage thresholds for a period longer than respective first and second opening delays of the first and second contactors prior to the issuance of the command to close the first and second contactors.

* * * * *